3,391,218
CATALYTIC DEHYDROGENATION OF PARAFFINIC HYDROCARBONS ENHANCED BY BENZENE
Herman S. Bloch, Skokie, Ill., assignor to Universal Oil Products Company, Des Plaines, Ill., a corporation of Delaware
No Drawing. Filed Sept. 12, 1966, Ser. No. 578,504
10 Claims. (Cl. 260—683.3)

ABSTRACT OF THE DISCLOSURE

Dehydrogenation of paraffins of about 3–20 carbon atoms in presence of hydrogen, Group VIII noble-metal catalyst, and about 0.5–2.0 moles aromatic hydrocarbon per mole paraffin.

The inventive concept herein described encompasses a process for the catalytic dehydrogenation of paraffinic hydrocarbons to produce olefinic hydrocarbons. More specifically, the invention is directed toward a process for the catalytic dehydrogenation of normal paraffins to produce long chain mono-olefinic hydrocarbons, which process increases the degree to which equilibrium conversion may be approached without incurring detrimental side reactions adversely affecting the efficiency, or selectivity of conversion to the desired mono-olefin. More particularly, through the practice of the present invention, and the use therein of a preferred catalytic composite, normal paraffins containing from about 3 to about 20 carbon atoms per molecule, and preferably from about 10 to about 18 carbon atoms per molecule are readily dehydrogenated to normal mono-olefinic hydrocarbons containing the same number of carbon atoms, and an extended period of operation is afforded during which the catalyst exhibits an unusual degree of stability. The present invention is particularly advantageous for the dehydrogenation of the longer chain normal paraffins to produce a mono-olefin, the use of which is intended to be the alkylation of aromatic compounds for the ultimate production of detergent intermediates.

The uses of the many olefinic hydrocarbons are numerous, and are applied with success in a wide variety of industries, particularly including the petroleum, petrochemical, pharmaceutical, plastics, and heavy chemical industries, etc. For example, propylene is utilized in the manufacture of isopropyl alcohol, propylene dimer, trimer and tetramer, cumene, polypropylene and in the synthesis of isoprene. Butene-1, cis-butene-2, and trans-butene-2 are extensively utilized in polymer and alkylate gasolines, in the manufacture of poly-butenes, butadienes, aldehydes, alcohols, as cross-linking agents for polymers and in the synthesis of various $C_4$ and $C_5$ derivatives. Isobutene finds use in the production of isooctane, butyl rubber, poly-isobutene resins, tertiary butyl chloride, copolymer resins with butadiene, acrylonitrile, etc. Pentenes are primarily employed in organic synthesis, although alpha-n-amylene (1-pentene), in addition to its use as a monomer for polymerizations of the Ziegler-Natta type, is often employed as a component blending agent in high octane motor fuel. The longer chain paraffins, having from about 7 to about 20 carbon atoms per molecule, and especially those having from 10 to 18 carbon atoms, can be successfully dehydrogenated to form the intermediate normal mono-olefins for use in the alkylation of benzene to make sulfonated detergents, or of phenol to make oxyethylated non-ionic detergents. Other uses of the longer chain mono-olefins include direct sulfation to form biodegradable alkyl-sulfates, direct sulfonation with sodium bisulfite to make biodegradable sulfonates; hydration to alcohols which could be employed to produce plasticizers, or synthetic lube oils; hydration to alcohols followed by dehydrogenation to form ketones which can be used to make secondary amines by reductive alkylation; ester formation by direct reaction with acids in the presence of a catalyst such as $BF_3$-etherate; and, in the preparation of di-long chain benzenes, the heavy metal sulfonate salts of which are excellent lube oil detergents.

Commercially economical success of a dehydrogenation process is depent to a great extent upon the use of a suitable dehydrogenation catalyst. Strictly thermal conversion of paraffins to the corresponding olefins can be carried out provided a sufficiently high temperature is utilized. However, as a result of high temperature pyrolysis, the principal reaction becomes cracking which is totally undesirable from the standpoint of product quality and quantity. At reaction temperature sufficiently low to avoid cracking, little or no dehydrogenation of the paraffin is experienced. Using a suitable dehydrogenation catalyst avoids this difficulty by permitting a relatively low temperature operation for dehydrogenation, while simultaneously eliminating excessive cracking. It is recognized that the prior art processes for dehydrogenation contains a multitude of suggestions for catalytic composites which can be employed in promoting the low temperature conversion of paraffins to olefins. Such catalytic composites generally consist of one or more metallic components from the metals of Groups VI and VIII of the Periodic Table, and compounds thereof. These prior art catalysts are generally composited with a carrier material comprising one or more refractory inorganic oxides selected from the group of alumina, silica, zirconia, magnesia, thoria, hafnia, boria, titania, etc. From a perusal of the prior art, however, it becomes fairly evident that any proposed catalyst appears to possess one or more drawbacks which detract from the suitability and acceptability thereof. Whereas some catalysts are too active, to the extent that undesirable side reactions are promoted even at low temperatures, others are too inactive at the lower temperature to promote an acceptable degree of dehydrogenation. Still others are insufficiently stable to be effective for an extended period of time, and as such do not foster a commercially attractive process. In conjunction with the various difficulties involved in the selection of a catalytic composite, consideration must be given to the aspect of reaction equilibrium. Prior art dehydrogenation processes are generally carried out under operating conditions which include temperatures of from about 700° F. to about 1300° F., pressures from 0 to 100 pounds per square inch gauge, liquid hourly spaced velocities of about 1.0 to about 10.0, and in the presence of hydrogen in an amount such that the hydrogen/paraffin mol ratio is 1:1 to about 20:1 or more. When extremely close to equilibrium conversion, regardless of the character of the catalyst being used, or the degree to which it successfully promotes dehydrogenation, various side reactions including cracking and skeletal isomerization are also effected. For instance, during the dehydrogenation of the longer chain normal paraffins, such as tridecane, at close to equilibrium conditions, a significant degree of conversion to di-olefins, tri-olefins and aromatic hydrocarbons results. These, as well as other undesired side reactions, obviously detrimentally affect the efficiency of conversion to the desired tridecene, and tend to adversely alter the economic considerations of the process. The principal object of the present invention is to provide a catalytic paraffin dehydrogenation process which can function at close to equilbrium conditions while increasing both conversion and the selectivity of the conversion to the desired mono-olefin.

Another object of the present invention is to provide a dehydrogenation process capable of producing long chain monolefins, containing from about 10 to about 18 carbon atoms per molecule, without incurring the simultaneous production of branched-chain olefins. When the dehydrogenation process of the present invention is conducted as hereinafter described in greater detail, I have observed that the small amount of side reactions which do occur take place in a manner such that dienes are formed to a greater extent than aromatic hydrocarbons which, in turn, are produced in greater quantities than are cracked products. There is essentially no skeletal isomerization of the longer chain normal olefins to branched chain olefins. Generally, the cracked products, as well as trienes, are produced only in trace quantities and, if the charge stock is substantially free from naphthenes, the amount of aromatic formation is extremely small. The presence of minor quantities of dienes in the mono-olefinic product is not particularly troublesome with respect to the ultimate use of the olefins. For example, when the olefin product is alkylated with benzene, the diene tends either to undergo cyclization to alkylindanes or alkyltetralins, or to form diphenyl alkanes, of which the first two may be utilized as part of the alkylate and the latter easily separated from the desired alkylate. Where the olefin is intended for direct sulfation to form biodegradable alkylsulfates, the product from dienes drops into the acid phase and again is easily separable from the desired product. Although spectroscopic methods of analysis have not detected any branched olefins in the product resulting from the practice of the present invention, up to about 5.0% or even 10.0% of mono-branching (based upon the quantity of mono-olefin) would not be objectionable for ultimate use in preparing biodegradable alkylbenzene sulfonate detergents. In the case of alkylsulfate detergents, however, branching in even such small amounts leads to unstable tertiary sulfates. In view of the high degree of stability of some of the alkylsulfate detergents prepared from the mono-olefinic product of the present invention, the degree of branching in said product must necessarily be exceedingly small.

The inventive concept involved in the process of the present invention involves the dilution of the paraffin charge stock with an aromatic hydrocarbon. Therefore, in a broad embodiment, the present invention relates to a catalytic dehydrogenation process which comprises reacting a paraffinic hydrocarbon, having from about 3 to about 20 carbon atoms per molecule, at dehydrogenating conditions and in the presence of hydrogen and an aromatic hydrocarbon.

A more specific embodiment of the present invention involves a catalytic dehydrogenation process which comprises reacting a paraffinic hydrocarbon, having from 3 to about 20 carbon atoms per molecule, in the presence of hydrogen and 0.5 to about 2.0 mols of benzene per mol of said paraffinic hydrocarbon, in contact with an arsenic-attenuated, platinum-containing catalytic composite and at dehydrogenation conditions including a pressure of from about 15.0 to about 40.0 p.s.i.g., a temperature of from about 800° F. to about 930° F. and a liquid hourly space velocity within the range of from about 12.0 to about 40.0.

Although the addition of the aromatic hydrocarbon will improve the dehydrogenation results obtainable with many of the catalysts described in the prior art, the present process may be further characterized with reference to a particularly preferred catalytic composite. This preferred catalyst comprises alkalized alumina containing a Group VIII noble metal and a component from the group consisting of arsenic, antimony, bismuth and compounds thereof. This catalyst makes use of a non-acidic, and especially halogen-free, refractory inorganic oxide carrier material. The term "non-acidic" is intended to preclude the use of halogen components and those inorganic oxides possessing the acidic function characteristics of material which fosters cracking reactions. The non-acidic carrier is combined with a Group VIII noble metal component, an alkali metal component and a catalytic attenuator. In some instances, the catalyst will comprise an alkaline-earth metal component, including calcium, magnesium and/or strontium, although the alkali metals, cesium, rubidium, potassium, sodium, and especially lithium are preferred. The Group VIII noble metals, palladium, iridium, ruthenium, rhodium, osmium, and especially platinum, may exist within the composite as the element, a chemical compound or in physical association with the other catalytic components. In any event, the Group VIII metal is used in an amount of from about 0.05% to about 5.0%, calculated as if existing as the elemental metal. The alkali metals will be utilized in an amount generally not exceeding 5.0% by weight; in order to achieve a proper balance between inhibiting the occurrence of side reactions and imparting the desired degree of stability, the alkali metals will usually be employed in significantly lower concentrations. Therefore, they will generally be present in a concentration within the range of from about 0.01% to about 1.5% by weight, calculated as the element. The catalyst may be prepared in any suitable manner, and it is understood that the particular method chosen is neither essential to nor limiting upon the present invention.

The fourth component of the preferred catalytic composite, in addition to the lithium, alumina and platinum, is selected from the metals of Group V–A of the Periodic Table and compounds thereof. In explanation, the term "Group-A" in the present specification and in the appended claims, alludes to the Periodic Chart of the Elements, Fisher Scientific Company, 1953. Also, it is recognized that the elements of this group are often referred to as "non-metallic" due to their peculiar characteristics. However, for the sake of convenience and consistency, such elements are herein referred to as "metal." Thus, the catalytic composite comprises a metallic component from the group of arsenic, antimony, bismuth and compounds thereof. Of these, arsenic and antimony are preferred, with arsenic being particularly preferred. These catalytic attenuators are employed in amounts based upon the concentration of the Group VIII metallic components, and will be present in an atomic ratio thereto within the range of from about 0.1 to about 0.8. Intermediate concentrations are preferably employed, such that the atomic ratio in the final catalytic composite is about 0.2 to about 0.5.

Although it has been shown that supported platinum-containing catalysts are very active in promoting the dehydrogenation of hydrocarbons, they inherently possess additional, objectionable properties stemming from the overall activity and ability which platinum has for promoting other kinds of reactions. The alkali metal component is employed for the primary purpose of effectively inhibiting a substantial amount of the cracking and skeletal isomerization reactions through neutralization of at least a portion of the inherent function possessed by platinum as well as that of the carrier material; however, sufficient cracking activity remains such that higher temperature operation to increase conversion is precluded. Furthermore, there still is present the capability of the platinum to promote isomerization and cyclization reactions. This is further compounded by the fact that where higher temperature operation can be afforded to increase conversion without a substantial increase in cracking, there exists an accompanying increase in the tendency to promote such other side reactions. Thus, at a given temperature and conversion level, the addition of lithium for the purpose of decreasing cracking activity to permit increasing temperature to increase dehydrogenation, falls short due to the increased tendency towards aromatization, whereby the efficiency of conversion suffers.

The primary function of the catalytic attenuator, arsenic, antimony and/or bismuth, is actually two-fold.

That is, the catalyst attenuator is specifically intended to poison the platinum to the extent that its residual cracking activity is virtually completely curtailed, and the tendency to promote other side reactions, particularly cyclization, is substantially eliminated. The uniqueness of these attenuators resides in the fact that the dehydrogenation activity of the platinum component is barely affected. No dehydrogenation activity is supplied by the attenuator, but rather a doping or poisoning effect directed toward the specific side reactions which the platinum component is otherwise capable of promoting. Another advantage afforded through the utilization of this particular attenuated catalyst, resides in the suppression of the tendency for the desired constituents of the product stream to undergo further dehydrogenation to dienes and trienes. The attenuator, as with the lithium and platinum components, may be incorporated within the catalytic composite in any suitable manner, an especially convenient method utilizing an impregnating technique followed by drying and calcination. When the attenuator is arsenic and/or antimony, the impregnating solution may be an ammonical solution of the oxides thereof, such as $As_2O_5$.

Notwithstanding the utilization of the above described attenuated platinum-containing catalyst, in addition to the use of particular ranges of operating conditions, both the conversion of the paraffinic hydrocarbon as well as the efficiency, or selectivity of conversion to the desired mono-olefin can be significantly enhanced through the utilization of the present inventive concept. An essential feature of the present invention involves the addition of an armoatic hydrocarbon in controlled quantities to the paraffinic charge stock. Mono-nuclear aromatic hydrocarbons are preferred, and are selected from the group consisting of benzene, toluene, and the three isomeric xylenes. Of these aromaic hydrocarbons, benzene is particularly preferred, and especially in those instances where the paraffinic hydrocarbon is a normal paraffin containing from 10 to about 20 carbon atoms per molecule, the mono-olefinic counterpart of which is intended for use in the alkylation of benzene to produce detergent alkylate. The aromatic hydrocarbon is added to the paraffin charge stock in an amount such that the mol ratio of aromatic hydrocarbon to paraffinic hydrocarbon is within the range of from about 0.5 to about 2.0, and preferably from about 0.6 to about 1.5. Greater quantities of the aromatic hydrocarbons do not appear to enhance further the results obtained, while lesser quantities than the preferred range result in a product effluent in which the aromatic hydrocarbon to mono-olefinic hydrocarbon mol ratio is less than that desired for the alkylation of the aromatic hydrocarbon. The improvement in both conversion and selectivity, and catalyst stability, is believed to be due to the characteristic of the aromatic hydrocarbon which enables it to be more readily and strongly adsorbed relative to either paraffin or mono-olefins, while being itself relatively inert under the operating conditions. Thus, the aromatic hydrocarbon quickly displaces product molecules from the catalyst surface thereby reducing the degree to which secondary reactions may be effected.

Although the process of the present invention, as hereinabove set forth, is applicable to both iso- and normal paraffins of up to about 20 carbon atoms per molecule, it is particularly advantageous when utilized in conjunction with those normal paraffinic hydrocarbons containing from about 10 to about 20 carbon atoms per molecule, and especially with those containing about 14 to about 18 carbon atoms per molecule. The process may be further characterized in that the operating conditions include a temperature within the range of from about 750° F. to about 1100° F., intermediate temperatures of from 800° F. to about 930° F. being preferred. The pressure within the reaction zone, being maintained by compressive hydrogen recycle, should be greater than about 10 p.s.i.g. with an upper limit of about 100 p.s.i.g. Pressures greater than about 40 p.s.i.g. do not appear to produce substantial additional benefits, and are not, therefore, generally employed. The preferred pressure range is from about 15 to about 40 p.s.i.g. It has been found that the liquid hourly space velocity (defined as volumes of hydrocarbon charge per hour per volume of catalyst disposed within the dehydrogenation reaction zone) should be above about 10. With respect to the longer chain paraffinic hydrocarbon (those containing from about 10 to about 20 carbon atoms per molecule) liquid hourly space velocities of from about 12 to about 40 further enhance the results obtained, particularly with respect to the stability of the catalytic composite. Although prior art dehydrogenation processes generally use a hydrogen concentration of from about 1 to about 20 mols per mol of hydrocarbon charge stock, through the use of the present invention, the hydrogen concentration can be lowered to a level below a mol ratio of about 15, and, in fact, hydrogen recycle ratios in the range of from about 1 to about 10 mols per mol of hydrocarbon are permitted without incurring detrimental effects such as rapid carbonization of the catalytic composite.

In the experiments discussed in the following portion of this specification, as well as in the accompanying example, the catalytic composite was disposed in a stainless-steel tube of ⅞-inch nominal inside diameter. The catalyst was disposed therein in amounts ranging from about 5.0 cc. to about 30.0 cc., above which was placed approximately 11.0 cc. to about 30.0 cc. of alpha-alumina particles. The heat of reaction was supplied by an inner spiral preheater located above the alpha-alumina ceramic particles. The non-attenuated catalytic composite was a commercially available gamma alumina carrier which had been impregnated with chloroplatinic acid and lithium nitrate to yield a finished catalyst containing usually about 0.75% by weight of platinum and 0.50% by weight lithium. When this catalytic composite was "doped" with an attenuator, for example arsenic, an ammoniacal solution of $As_2O_5$ was utilized in the quantity required to give the desired atomic ratio of arsenic to platinum. The incorporation of the arsenic component was made by impregnating the lithiated alumina-platinum composite, followed by drying at a temperature of about 210° F. and calcination in a muffle furnace for approximately 2 hours at a temperature of 932° F.

Previous work in the field of dehydrogenation of paraffinic hydrocarbons has shown the superiority of the lithiated-alumina, arsenic-attenuated platinum catalyst, and the preferred operating conditions as hereinbefore set forth; the benefits incurred, as a result of the incorporation of an aromatic hydrocarbon in the paraffinic feed, are experienced with other dehydrogenation catalysts as well, however. Thus, where two catalysts were prepared, both containing arsenic, but one void of lithium or other alkalizing agent, the results obtained with the latter, at identical operating conditions, indicated a conversion of 15.7% and a selectivity to the desired mono-olefin of 77.1%. With the catalyst containing lithium, in addition to the arsenic, the conversion increased to 21.4%, while the selectivity increased to 84.1%. Where both catalysts contained lithium, but one catalyst was prepared void of arsenic or other catalytic attenuator, the addition of arsenic increased the conversion 4.7% (based upon paraffin feed) although the selectivity of conversion remained substantially the same.

In another instance wherein the purpose was to determine the stabilizing effect exhibited by the attenuating component, namely, arsenic, the results after 110 hours of operation without arsenic indicated a conversion of 5.8%, down from an initial conversion of 8.2%. When utilizing the arsenic-attenuated catalyst, the initial conversion was 7.8%, while the conversion at the end of 115 hours, was 12.5%. During this period of operation, the initial operation on both catalysts was effected at a temperature of 427° C., being increased to a level of 477° C. at about 105 hours.

During the dehydrogenation of n-dodecane at a liquid hourly space velocity of 4.0, a conversion of 47.8% was obtained, however, the selectivity for dodecenes was only 22.6%. Upon increasing the liquid hourly space velocity to 8.0, the conversion became 34.9% accompanied by a selectivity of conversion of 27.8%. A third operation at the increased space velocity of 16.0 indicated a conversion of 18.9% with a selectivity of 84.2%.

Again utilizing n-dodecane as the paraffin charge, in an operation at 32.0 liquid hourly space velocity, 8.0 hydrogen/hydrocarbon mol ratio, 10.0 p.s.i.g. and 466° C., the conversion activity decreased from 18.0% to 12.0% during the first 50 hours of operation. Under the same operating conditions, with, however, the addition of 2,000 p.p.m. of water, the percent conversion remained substantially relatively constant in the range of 14.5% to 16.0% for more than 100 hours. The effect of pressure has been indicated by comparing an operation at 10.0 p.s.i.g., after 300 hours at which the rate of decline in conversion of n-dodecane was 1.0% per 80 hours. During an operation at which the pressure had been increased to 15.0 p.s.i.g., other operating conditions being identical, the rate of conversion decline was reduced to 1.0% per 400 hours.

The following example is presented for the purpose of illustrating the additional beneficial results obtained when the dehydrogenation process is effected with aromatic addition to the paraffin charge stock. It is not intended to limit the scope of the invention, as defined by the appended claims, to the catalyst, operating conditions, concentrations, charge stock, etc., used in this example. Modification of these variables, within the aforesaid limits, may be made by those skilled in the art of catalytic conversion operations in order to achieve optimum economic advantage in a particular situation.

For both operations herein described, the catalytic composite, having an apparent bulk density of 0.4 gram per cc., was a composite of gamma alumina, 0.75% by weight of platinum, 0.50% by weight of lithium, and arsenic in an atomic ratio to platinum of 0.3. The operating conditions included a temperature of 850° F., a liquid hourly space velocity of 32.0, an operating pressure of 15.0 p.s.i.g., a hydrogen/hydrocarbon mol ratio of 8.0, and 2,000 p.p.m. of water was added to the n-dodecane charge stock. Without the further addition of benzene, the conversion was 10.7% and the selectivity of conversion to the desired mono-olefin was 93.3%. The second operation differed from the first only in that benzene was added in an amount of about 35.0% by weight, such that the mol ratio of benzene to n-dodecane was 1.175 to 1, with the result that the percent conversion increased to 11.5, accompanied by a selectivity of conversion to the mono-olefin of 96.6%.

Example

In addition to the benefits resulting from the increased conversion and efficiency of conversion, benzene dilution of the paraffin feed imparts a significant degree of stability to the overall operation. This is shown in this example in which the charge stock was n-dodecane and the operating conditions included a pressure of 15.0 p.s.i.g., a liquid hourly space velocity of 32.0, a hydrogen/hydrocarbon mol ratio of 8.0 and a water addition rate of 2000 p.p.m., based upon the paraffin charge stock. For the first 15 hours of operation, the temperature was maintained at 825° F., and subsequently increased to a temperature of 850° F. for the remainder of the operation. Periodic samples were obtained for the purpose of determining the percent of conversion of the n-dodecane and the selectivity of conversion to the desired n-dodecene. For the operation involving benzene dilution, the benzene was added to the n-dodecane charge stock in an amount such that the mol ratio of benzene to dodecane was controlled at a level of 1.175 of 1. The results with respect to conversion are indicated in the following table, and are those obtained at the end of the indicated time period.

TABLE.—STABILITY EFFECT OF BENZENE

| Time in Hours | Conversion, Percent | |
|---|---|---|
| | No Benzene Dilution | Benzene Dilution |
| 20 | 12.0 | 10.5 |
| 25 | 11.5 | 10.9 |
| 30 | 11.2 | 11.2 |
| 40 | 10.7 | 11.5 |
| 50 | 10.4 | 11.6 |
| 60 | 10.3 | 11.7 |
| 70 | 10.2 | 11.7 |
| 80 | 10.1 | 11.7 |
| 90 | 10.0 | 11.7 |

The stability with respect to conversion of the n-dodecane is evident upon reference to the foregoing tabulated data. It might be added that the efficiency of conversion, in the absence of benzene dilution and at the end of the initial 15 hours during which time the temperature was maintained at 825° F., was 93.8. This is contrasted to the efficiency of conversion obtained during the first 15 hours with respect to the benzene-dilution operation, which efficiency was virtually 100.0% as a result of only trace quantities of aromatic hydrocarbons and di-olefins in the product effluent. With respect to that portion of the operation effected at a temperature of 850° F., after 25 hours using benzene dilution, the efficiency of conversion was 98.7 as contrasted to 91.4 in the absence of benzene. From a composite sample obtained during the 90 to 95 hour portion of the operation, with benzene dilution, the selectivity of conversion was 97.8. This in turn was contrasted to an efficiency of conversion of 94.1, obtained in the absence of benzene addition, on a composite sample taken during the 81 to 87 hour portion of the operation.

The foregoing example and specification clearly indicate the method by wihch the present invention is conducted, and illustrates thereby the benefits to be afforded through the utilization thereof. Notwithstanding the careful selection of catalytic composite and operating conditions, the addition of an aromatic hydrocarbon to the paraffin charge stock has been shown to effect an increase in both conversion and selectivity thereof to the desired mono-olefin, and has also imparted an unusual degree of stability to the overall operation.

I claim as my invention:

1. A catalytic dehydrogenation process which comprises reacting a paraffinic hydrocarbon, having from about three to about twenty carbon atoms per molecule, at dehydrogenating conditions and in the presence of hydrogen, a Group VIII noble-metal catalyst, and an aromatic hydrocarbon in a mole ratio of aromatic to paraffin of from about 0.5 to about 2.0.

2. The process of claim 1 further characterized in that said aromatic hydrocarbon comprises toluene.

3. The process of claim 1 further characterized in that said aromatic hydrocarbon comprises a xylene.

4. The process of claim 1 further characterized in that said dehydrogenating conditions include a temperature above about 750° F., a pressure of at least about 10 p.s.i.g. and a liquid hourly space velocity above 10.

5. The process of claim 1 further characterized in that said aromatic hydrocarbon is benzene.

6. The process of claim 1 further characterized in that said paraffinic hydrocarbon is a straight-chain paraffin containing from about 10 to 18 carbon atoms per molecule.

7. The process of claim 6 further characterized in that said paraffin is n-undecane.

8. The process of claim 6 further characterized in that said paraffin is n-dodecane.

9. The process of claim 6 further characterized in that said paraffin is n-hexadecane.

10. A catalytic dehydrogenation process which comprises reacting a paraffinic hydrocarbon, having from 3 to about 20 carbon atoms per molecule, in the presence of hydrogen and 0.5 to about 2.0 mols of benzene per mol of said paraffinic hydrocarbon, in contact with an arsenic-attenuated, platinum-containing catalytic composite and at dehydrogenating conditions including a pressure of from about 15 to about 40 p.s.i.g., a temperature of from about 800° F. to about 930° F. and a liquid hourly space velocity within the range of from about 12 to about 40.

References Cited

UNITED STATES PATENTS

| 3,126,426 | 3/1964 | Turnquest et al. | 260—683.3 |
| 3,168,587 | 2/1965 | Michaels et al. | 260—683.3 |
| 3,291,855 | 12/1966 | Haensel | 260—683.3 |

OTHER REFERENCES

Bloch, H. S.: "UOP way to linear alkylbenzene," Oil Gas J., 78–91 (Jan. 16, 1967).

DELBERT E. GANTZ, *Primary Examiner.*

GEORGE E. SCHMITKONS, *Assistant Examiner.*